R. OLDHAM.
STREET CLEANING UTENSIL.
APPLICATION FILED JUNE 16, 1916. RENEWED OCT. 15, 1917.
1,266,522. Patented May 14, 1918.
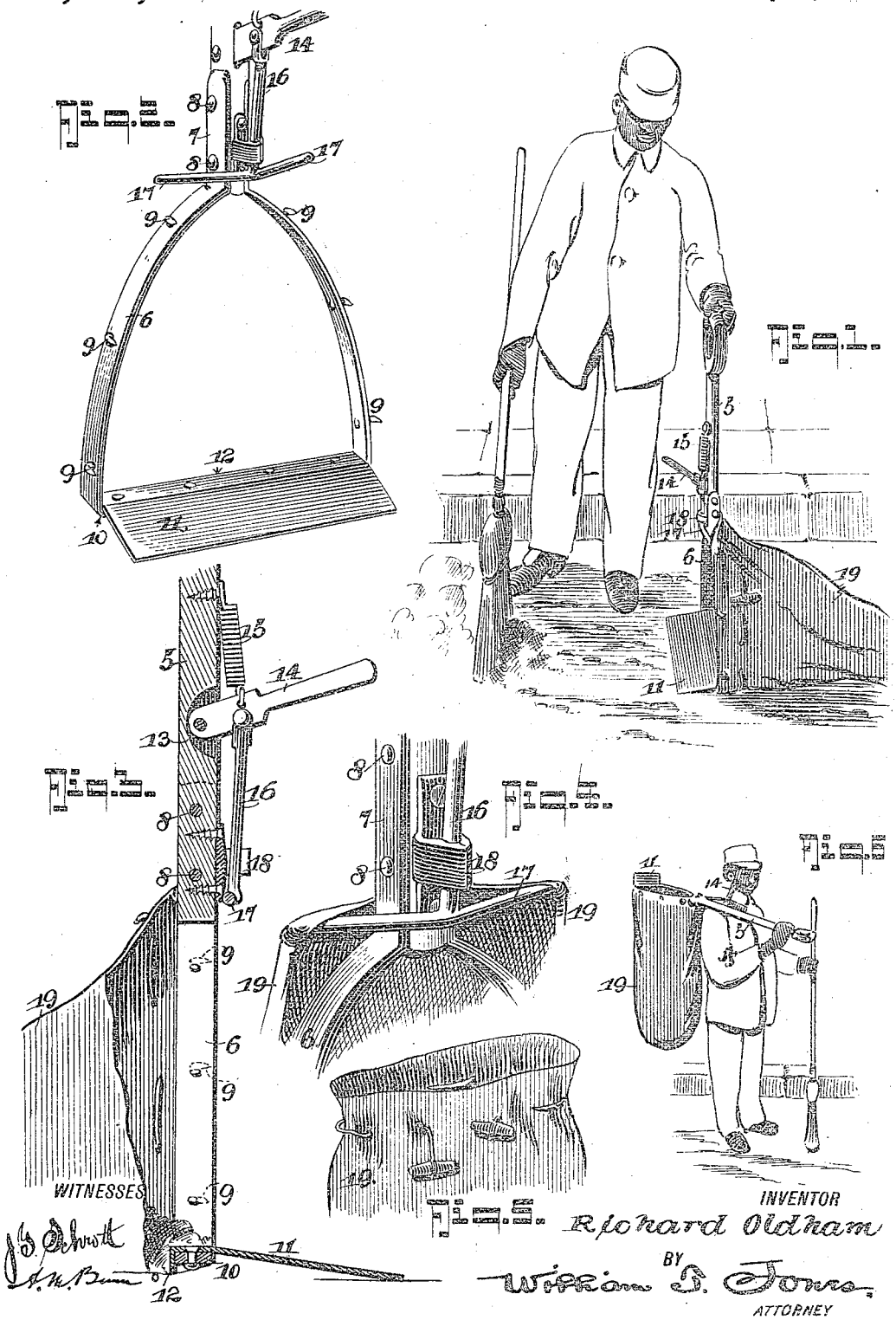
INVENTOR
Richard Oldham
BY
William P. Jones
ATTORNEY

UNITED STATES PATENT OFFICE.

RICHARD OLDHAM, OF JACKSONVILLE, FLORIDA.

STREET-CLEANING UTENSIL.

1,266,522. Specification of Letters Patent. Patented May 14, 1918.

Application filed June 16, 1916, Serial No. 103,989. Renewed October 15, 1917. Serial No. 196,734.

*To all whom it may concern:*

Be it known that I, RICHARD OLDHAM, a citizen of the United States, residing at Jacksonville, in the county of Duval and State of Florida, have invented certain new and useful Improvements in Street-Cleaning Utensils, of which the following is a specification, reference being had therein to the accompanying drawings.

My invention relates to improvements in street cleaning utensils.

As at present practised in a great number of cities, the system of cleaning streets involves the employment and coöperation of at least two men and a horse and suitable conveyance. One man sweeps the refuse from the center of the street to the curbings, where at convenient distances apart, it is bunched and formed into suitable piles. A second man accompanied by a horse and cart follows, the man walking near the curbings and with the use of a shovel picking up and depositing the piles of refuse in the cart. The two men and the horse and cart comprise what may be termed a single cleaning team, or a unit, and as many teams are simultaneously worked as the particular circumstances require. It follows, therefore, that the system now in vogue and in all of its completeness entails the employment of a large force of men and conveyances, and is open to the objection that the wind frequently blows the dirt upon the side-walk, buildings and passersby while it is being transferred from the street to the cart.

The object of my invention is to eliminate these inherent disadvantages by providing a device which will minimize the working force to a marked degree, as well as, effecting a more sanitary dispositon of the refuse.

To the accomplishment of the recited object, and others coördinate therewith, the preferred embodiment of my invention resides in that construction and arrangement hereinafter described, shown in the accompanying drawings, and embraced within the scope of the appended claims.

In said drawings:

Figure 1 is a perspective view of the utensil as it appears in actual operation.

Fig. 2 is a perspective view, enlarged, of the bottom frame and appurtenances.

Fig. 3 is a vertical longitudinal section of the frame and handle, and a portion of the bag.

Fig. 4 is a detailed perspective view of the bag holding lever.

Fig. 5 is a detailed perspective view of the mouth of the bag, and

Fig. 6 is a perspective view illustrating the manner of carrying the complete utensil when filled.

Referring more particularly to the drawings, the numeral 5 designates a rigid vertical handle, and 6 a substantially stirrup-shaped bag frame, formed, preferably of an integral bar of metal having its upper ends arranged in parallelism and secured to opposite sides of the lower extremity of the handle by transversely extending bolts 8. Disposed in spaced relation about the sides of the frame are a plurality of bag engaging hooks 9, while fixed to the base 10 is an outwardly projecting lip 11 which is deflected at its rear to present an angular extension 12 serving in the dual capacity of an additional bag engaging means and in combination with the outer edge of the lip 11 as a support for the frame and handle.

At a point slightly above the ends of the frame, indicated at 7, I form in the shank of the handle a recess 13 for receiving and fulcruming one end of a lever 14. This lever is disposed laterally with respect to the handle, and upon diametrically opposite sides of its inner extremity it is pivotally connected to a coil spring 15 and a link 16. The other end of the spring is suitably fixed to the handle, and the corresponding end of the link merges into a longitudinally bowed cross arm 17, the terminals of the arm in the same plane with the hooks 9. In order to guide the link 16 I mount an eye 18 between the ends 7 of the frame.

In application the outer marginal edges of the bag 19 are first engaged by the hooks 9 and the extension 12 of the frame 6, whereupon the lever 14 is constrained forwardly and the free edge of the bag adjusted over the terminals of the cross arm 17. Upon releasing the lever, the contractile spring 15 exerts its force causing the cross arm together with the edge of the bag to move in a reverse direction. In this position, as exhibited in Fig. 4 of the drawings, it will be seen that the cross arm coöperates with the rear of the lower extremity of the handle shank to maintain the bag perfectly taut relatively to the frame. When it is desired to free the bag from the frame, the foregoing operation is reversed, and when the bag is full, it may be easily released.

In place of sweeping to the curbings, an employee equipped with my invention, gathers the refuse in the bag until the same has been filled, when it is deposited, tied and left at any convenient location. The bags are made of light burlap enabling an employee to easily carry several on his person so that as quickly as one bag has been filled an empty one may be substituted. Aside from entirely eliminating sweeping to the curbings and the use of the attendant and conveyance which would necessarily have to follow such operation, the dirt is not left for a considerable time exposed to the wind and other extraneous influences which would obviously tend to disturb and separate the piles; nor would there be any likelihood or opportunity of the dirt being blown in diverse directions as it was being transferred from the piles to a conveyance. Furthermore, the refuse is securely tied in bags, and one team can take the place of three in making collections, and accomplish this in a far more thorough and sanitary manner. Each utensil is extremely simple and light in construction, and may be operated and carried from place to place with facility. Economy dominates throughout, from the cutting of pay rolls and the discarding of teams, carts and the like, and the expense of their maintenance, to the cost of sacks which sell at the ridicuously low figure of two and one-half cents apiece.

It should be understood that in broader aspects my invention comprehends the employment not only of the various means described, but of equivalent means for performing the recited functions. Still further, it should be understood that the invention is capable of use in any large grain house or elevator, stable or public place where the idea is to avoid as much dirt as possible in a highly satisfactory manner.

What is claimed, is:

1. A device of the character described comprising a frame having a rigid handle lying in the same plane as the plane of the frame, and means carried by the handle for drawing a bag taut with respect to both the frame and the handle.

2. A device of the character described comprising a bag frame having a rigid handle lying in the same plane as the plane of the frame, and means carried by the handle for releasably securing a bag to said frame.

3. A device of the character described comprising a substantially stirrup-shaped frame having an extension, bag fastening means arranged upon the sides of said frame, a lip carried by the base of the frame and having a rear extension serving as an additional bag engaging means, and means carried by said extension for drawing the bag taut relatively to said frame.

4. A device of the character described comprising a bag frame having an extension, a spring controlled lever fulcrumed to said extension, and a slidable cross arm connected to said lever adapted to coöperate with the frame for holding the bag.

In testimony whereof, I hereunto affix my signature, in the presence of two witnesses.

RICHARD OLDHAM.

Witnesses:
 MILES W. LEWIS,
 JAMES H. BUNCH.

Copies of this patent may be obtained for five cents each, by addressing the "Commissioner of Patents, Washington, D. C."